CENTER TUNING CIRCUIT FOR FREQUENCY MODULATION DETECTORS

Filed Dec. 14, 1950

2 Sheets-Sheet 1

INVENTORS:
EUGENE O. KEIZER
& MARLIN G. KROGER
BY H. L. Newton
ATTORNEY

INVENTORS:
EUGENE O. KEIZER,
& MARLIN G. KROGER
BY H. W. Newton
ATTORNEY

Patented June 29, 1954

2,682,606

UNITED STATES PATENT OFFICE 2,682,606

CENTER TUNING CIRCUIT FOR FREQUENCY MODULATION DETECTORS

Eugene O. Keizer and Marlin G. Kroger, Princeton, N. J., assignors to Radio Corporation of America, a corporation of Delaware Application December 14, 1950, Serial No. 200,728

17 Claims. (Cl. 250—27)

Figures 1, 2, 5:
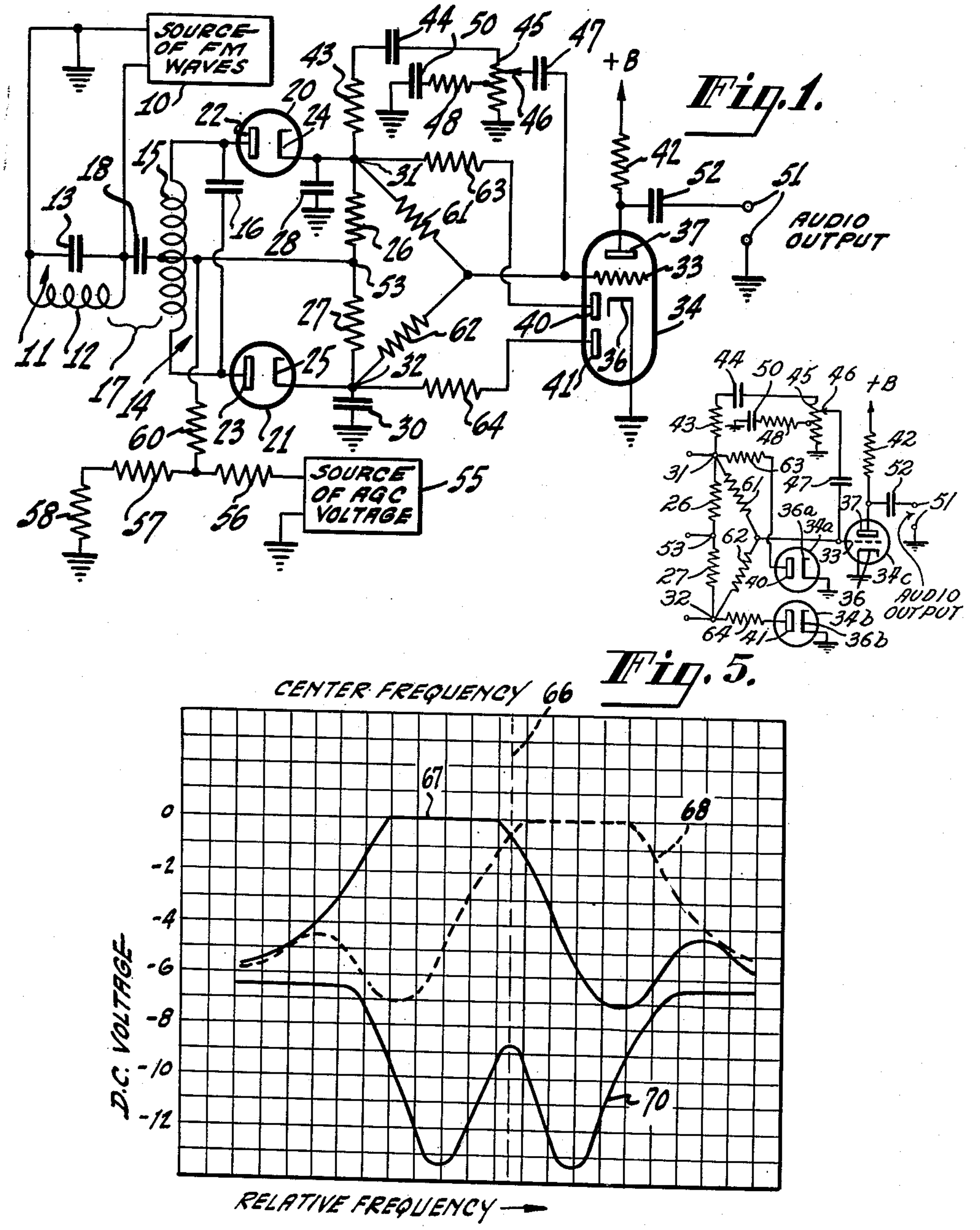

This invention relates generally to frequency or phase modulated carrier wave receivers, and particularly relates to a detector of angle modulated carrier waves which substantially eliminates the undesired side responses of a conventional detector.

The expression "angle modulated carrier waves" is meant to include phase modulated and frequency modulated carrier waves as well as waves which are both phase and frequency modulated. It may be pointed out that the frequency modulated carrier waves transmitted by broadcast transmitters are of the latter type because the pre-emphasis provided for higher modulation frequencies produces a carrier wave partly frequency modulated and partly phase modulated. While a frequency modulated carrier wave is obtained by deviating the carrier wave with respect to its mean frequency to an extent proportional to the amplitude of the modulation frequency, a phase modulated carrier wave has a frequency deviation which increases with the modulation frequency.

It is well known that when a frequency modulated carrier wave receiver is tuned over the frequency spectrum, three responses are obtained for each broadcast station. These three responses correspond to the three sloping regions of the S-shaped discriminator curve. The outer two of these sloping sections are more non-linear than the center sloping section, their shape is dependent upon the alignment of previous circuits and may vary with signal amplitude, and consequently they respond more to noise than the center sloping region. Therefore, the intermediate or center response is the correct response. Accordingly, tuning of a receiver to a frequency modulated carrier wave station presents considerable difficulty in view of the undesired side responses which may cause considerable distortion at high signal levels. It is also known that usually considerable interstation noise is developed when the receiver is tuned from station to station. Accordingly, various circuits which are commonly called squelch or noise suppression circuits have been devised to eliminate either interstation noise or the undesired side responses which are usually encountered when a frequency modulated carrier wave is tuned in on both types of undesired response. Some of these prior art circuits are comparatively complicated and require a number of additional circuit components. They are, therefore, too expensive to be used in broadcast receivers. Other of the prior art noise suppression circuits fail to suppress the undesired side responses to a sufficient extent.

Still another interstation noise suppressor circuit has been disclosed in the patent to Koch 2,371,397 granted on March 13, 1945. In accordance with the Koch patent, the audio amplifier is cut off in the neighborhood of a station to be tuned and is rendered conducting when the carrier wave is correctly tuned in. However, even with this circuit the undesired side responses cannot be entirely eliminated. Furthermore, the Koch circuit may become too selective so that it cannot be used in the audio channel of a television receiver where the carrier wave amplitude modulated by the video signal may have to be tuned in over a comparatively wide frequency range to obtain the correct image reproduction. Furthermore, too small a selectivity reduces the oscillator drift which can be tolerated before the sound is cut off.

It is accordingly the principal object of this invention to provide an improved simple detector of angle modulated carrier waves for tunable signal receiving systems and the like, which substantially eliminates undesired, normally-encountered side responses, thereby to provide single spot tuning.

A further object of the invention is to provide, in a frequency modulated carrier wave receiver, a modulation signal detector coupled to a modulation signal amplifier which is normally cut off until the wave is properly tuned in to the center frequency of the discriminator network to permit reproduction of the modulation signal without distortion and which does not require any additional tuned circuits.

Another object of the invention is to provide a frequency modulated carrier wave detector having circuit means for suppressing substantially the undesired side-band responses without requiring an additional audio filter, and which provides a sufficiently broad response over the center frequency so that the detector of the invention may also be used in the sound channel of a television receiver.

The center tuning circuit of the invention may include a conventional frequency modulated carrier wave detector such, for example, as the Seeley discriminator disclosed and claimed in Patent 2,121,103 or a so-called ratio detector of the type disclosed and claimed in the Seeley Patent 2,496,818. An audio amplifier is coupled in the conventional manner to the output of the discriminator-rectifier. A bias voltage is impressed through the discriminator-rectifier. A bias voltage is impressed through the discriminator rectifier on the audio amplifier to render it normally non-conducting. This bias voltage may, for example, be derived from the automatic gain control voltage (AGC) which is usually developed in a broadcast receiver.

A further pair of rectifiers is provided in accordance with the invention on which direct current voltages developed by the discriminator rectifier are impressed. These voltages are utilized to balance the bias voltage impressed on the audio amplifier thereby to permit the amplifier to conduct when the received carrier wave is tuned within a predetermined frequency range. The further rectifiers also have a clamping action so that the voltage impressed on the control grid of the audio amplifier does not substantially exceed ground potential. The width of the effective frequency range within which the audio amplifier is operative may be controlled by a pair of resistors incorporated in the center tuning circuit.

In this manner the undesired side responses of a strong station can be completely eliminated while the undesired side responses of a weak station are substantially reduced and may also be entirely eliminated depending upon the amount of gain provided in the intermediate frequency channel of the receiver.

Figure 4:
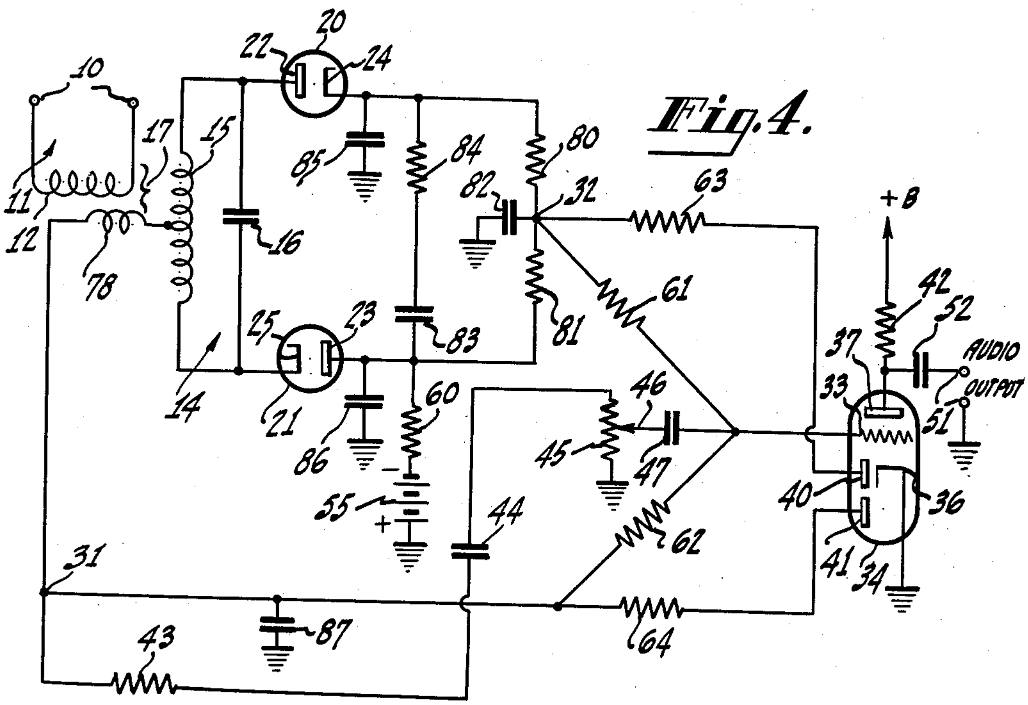
Figure 3:
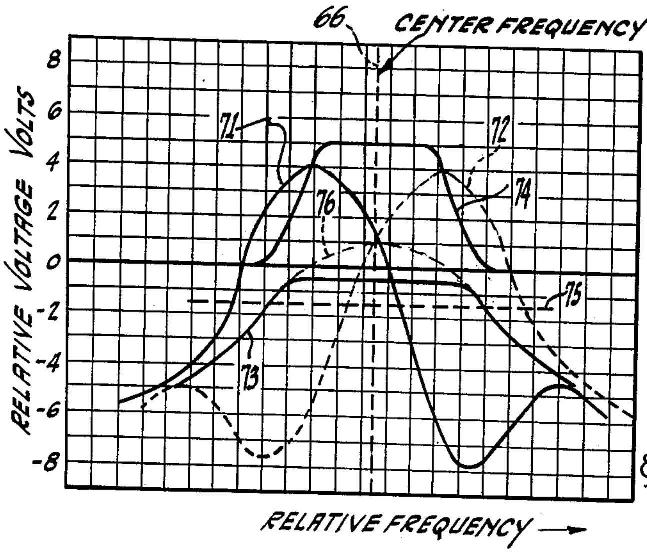

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a circuit diagram of a conventional Seeley discriminator rectifier and audio amplifier stage and including the center tuning circuit of the present invention;

Figures 2 and 3 are graphs showing curves indicating the variations of the direct current voltages at certain points of the circuit of Figure 1 with a change of the center frequency of the impressed carrier wave; and Figure 4 is a circuit diagram of a conventional ratio detector and audio amplifier stage including the noise suppressor or center tuning circuit in accordance with the present invention.

Figure 5 is a modification of the schematic circuit diagram of a conventional Seeley discriminator rectifier and audio amplifier stage shown in Figure 1.

Referring now to the drawings in which like components have been designated by the same reference numerals throughout the figures and particularly to Figure 1, there is illustrated a center tuning angle modulated carrier wave detector including a tunable source 10 of angle or frequency modulated (FM) carrier waves. The source 10 represents schematically any angle modulated carrier wave which is to be demodulated such as that obtained from a tunable radio receiver and particularly from its intermediate frequency amplifier stages. The waves obtained from source 10 are impressed on primary resonant circuit 11 including inductor 12 across which is connected capacitor 13. Primary resonant circuit 11 is tuned to a predetermined frequency, and the waves to be received must be tuned so that their frequency coincides with the resonant frequency of primary circuit 11 as is well known. Secondary resonant circuit 14 includes inductor 15 shunted by capacitor 16. Secondary resonant circuit 14 is tuned to the same frequency to which primary circuit 11 is tuned.

Resonant circuits 11 and 14 are inductively coupled as indicated by bracket 17. Furthermore, one terminal of primary circuit 11 is coupled to an intermediate point, which may be the midpoint, of inductor 15 by capacitor 18.

Resonant circuits 11 and 14 represent the discriminator network of the discriminator-rectifier. The discriminator network is followed by a rectifier circuit including two rectifiers 20 and 21 each having an anode 22 and 23 and a cathode 24 and 25 respectively. The two rectifier anodes 22, 23 are connected to the terminals of secondary circuit 14. The two cathodes 24, 25 are connected together by a pair of output load resistors 26, 27, the junction point of which is connected to the midpoint of inductor 15. Capacitor 28 is connected between rectifier cathode 24 and ground and serves the purpose to bypass carrier frequency currents. Instead of connecting rectifier cathode 25 directly to ground as is conventional, a capicitor 30 is provided between cathode 25 and ground to bypass both modulation signal and carrier frequency currents. If the carrier wave is modulated with an audio signal, capacitor 30 should be an audio frequency bypass capacitor.

The discriminator rectifier as described is a conventional Seeley discriminator as disclosed in a Patent 2,121,103 and its operation is well known. Due to the inductive coupling between inductors 12 and 15 the carrier wave impressed on primary circuit 11 induces two carrier wave voltages which appear at the terminals of secondary circuit 14. These two carrier wave voltages are equal and 180 degrees out of phase at the terminals of inductor 15. The phases of these two carrier wave voltages are now compared with the phase of a reference carrier wave voltage which is the voltage injected through coupling capacitor 18 into secondary resonant circuit 14. When the instantaneous frequency of the wave coincides with the frequency to which both resonant circuits 11 and 14 are tuned, this reference voltage is 90 degrees out of phase with respect to the two carrier wave voltages developed at the two terminals of inductor 15. However, when the frequency of the impressed wave deviates momentarily from the discriminator frequency, the phase relation between the two inductively induced voltages and the reference voltage is no longer 90 degrees. Consequently, at the two terminals of inductor 15 resultant carrier wave voltages are developed having magnitudes which depend upon the angular modulations of the original carrier waves. Specifically, the amplitudes of the resultant carrier wave voltages are a function of phase deviations which in turn depend upon the angular modulations or frequency modulations of the impressed carrier waves.

It will now be obvious that depending upon the instantaneous frequency of the impressed carrier waves either diode 20 or diode 21 will conduct a larger current than the other diode. These direct currents are added differentially and are obtained from point 31 which has the potential of diode cathode 24 with respect to point 32 which has the potential of diode cathode 25. It will be understood that point 32 is maintained at a modulation signal ground potential by capacitor 30 while capacitor 28 maintains point 31 at a carrier frequency ground potential.

The modulation signal, which may be an audio signal, is, therefore, obtained from point 31 and may be impressed on the control grid 33 of audio amplifier 34 which further includes a cathode 36 and an anode 37. Audio amplifier 34 is also provided with two further anodes 40 and 41 which, together with cathode 36, form two rectifiers. Reference is made to Figure 5 where it is shown that separate electron tubes may be provided in place of the twin diode-triode tube 34. Separate rectifier tubes 34*a* and 34*b* and a triode tube 34*c* are provided each of which has a separate cathode 36*a*, 36*b* and 36*c*, respectively, which are connected with ground potential. The circuit connections to the rectifiers 34*a* and 34*b* and audio amplifier 34*c* are the same as will hereinafter be described for the twin diode-triode tube 34 of Figure 1. The circuit connection points 31, 53 and 32 may be connected with a pair of rectifiers 20 and 21 and associated circuitry in the same manner as the corresponding circuit connection points which are shown in Figure 1. The cathode 36 is preferably grounded while anode 37 is connected to a suitable source of anode voltage indicated at +B through resistor 42. The audio signal circuit connection between point 31 and control grid 33 includes resistor 43, coupling capacitor 44 and potentiometer resistor 45 connected serially between point 31 and ground. Capacitor 28 and resistor 43 may form the conventional de-emphasis network. The audio signal may be obtained from variable tap 46 on potentiometer resistor 45 coupled to control grid 33 by coupling capacitor 47. The series combination of resistor 48 and capacitor 50 may be connected between a fixed tap on potentiometer resistor 45 and ground to provide tone control.

The amplified audio signal may be obtained from output terminals 51, one of which is grounded while the other one is coupled to anode 37 through coupling capacitor 52. The operation of the circuit described so far is conventional and further explanation is not believed to be necessary.

In accordance with the present invention, a muting circuit is provided which permits effectively single spot tuning of the detector described. To this end, a bias voltage is impressed on point 53 which is the junction point of load resistor 26, 27 and which is in turn connected to the midpoint of inductor 15. The bias voltage may, for example, be a source of automatic gain control (AGC) voltage indicated by box 55. It is well known that a gain control voltage is derived from most conventional receivers. The voltage obtained from source 55 may be reduced by a voltage divider network including resistors 56, 57 and 58 connected between source 55 and ground. The junction point of resistors 56 and 57 is connected to point 53 through dropping resistor 60. Accordingly, both secondary circuit 14 and load resistors 26, 27 are subjected to this bias voltage.

Points 31 and 32 are connected to control grid 33 through resistors 61, 62 respectively. Broadening resistors 63 and 64 are connected respectively between point 31 and anode 40 and between point 32 and anode 41. Voltage source 55, dropping resistor 60, resistors 61 and 62 and broadening resistors 63, 64 in combination with anodes 40 and 41 form the muting circuit of the present invention and its operation will now be explained.

It will be understood that the operation of the center tuning circuit of the invention has substantially no effect on the discriminator rectifier because point 32 is bypassed to ground by capacitor 30 for audio frequency currents and because resistors 61 to 64 have such a high resistance that their alternating current loading effect on the discriminator output is negligible. The operation of the center tuning or muting circuit of the invention will now be explained by reference to Figures 2 and 3 showing the direct current voltages at various points of the circuit of Figure 1 with respect to the relative frequency of the received carrier waves. The vertical dotted line 66 in Figures 2 and 3 indicates the center frequency of the discriminator network. Curve 67 shows the voltage at anode 40 with respect to the relative frequency of the impressed carrier wave while dotted curve 68 shows the voltage at anode 41. Curve 70 of Figure 2 indicates the direct current voltage of point 53.

In Figure 3, curves 71 and 72, the latter being dotted, illustrate the voltages at points 31 and 32 of the circuit of Figure 1. The solid curve 73 indicates the direct current voltage which exists at the control grid 33 and curve 74 shows the audio output voltage derived from output terminals 51.

When no modulated carrier wave is received or when the modulated carrier wave is completely mistuned, both rectifiers 20 and 21 are non-conducting. Consequently, no rectified voltages are developed at points 31 and 32. Accordingly, points 31, 32, control grid 33 and anodes 40 and 41 are maintained at the negative bias potential impressed on point 53 from source 55 and resistor 60. This condition is shown at the left hand side of Figures 2 and 3. Audio amplifier 36, 33, 37 and rectifiers 36, 40 and 36, 41 are accordingly biased off so as to be non-conducting.

As the receiver is tuned toward the center frequency of the discriminator, one of the rectifiers 20 or 21 will conduct more current than the other rectifier. Let it be assumed that the frequency of the received carrier wave is increased and approaches the center frequency of the discriminator and let it further be assumed that under these conditions rectifier 20 will conduct more current than rectifier 21. Accordingly, point 31 will become more positive with respect to point 53 as shown by curve 71. The voltage at point 53 is indicated by curve 70. At the same time, as illustrated by curve 72, point 32 will become negative with respect to point 31 but will, of course, be positive with respect to point 53. Eventually the potential at point 31 (see curve 71) will equal the bias voltage impressed on point 53 so that curve 71 will become first zero and then positive.

Diode 40, 36 will then become conducting and the potential at anode 40 will be clamped at approximately zero, as is clearly shown by curve 67. However, due to the provision of broadening resistor 63 the potential at point 31 is permitted to continue in a positive direction but at a lesser rate than before, since part of the additional voltage developed across load resistor 26 results in a depression of the voltage at point 53 to a value more negative than that of the impressed bias voltage as clearly shown by curve 70. For the same reason, as the positive voltage at point 31 is reduced again (see curve 71) the voltage at point 53 (see curve 70) rises again.

The voltage impressed from points 31 and 32 through resistors 61, 62 on control grid 33 is one half of the arithmetical sum of the voltages at points 31 and 32 because the resistances of resistors 61 and 62 are equal in magnitude. As clearly shown by curve 73, the voltage of control grid 33 is always negative. Eventually the center tuning region of the discriminator is reached and the voltage of the control grid 33 exceeds the cut-off voltage of the audio amplifier indicated by dotted line 75 of Figure 3. In this region the triode section of amplifier 34 will conduct and will amplify the audio signal, the audio output being shown by curve 74 in Figure 3.

It will now be appreciated that the direct current control potential impressed on control grid 33 is the composite sum of three direct current potentials. The first of these potentials is the negative bias potential impressed on point 53 from source 55. The second of these potentials is a positive potential which is developed across a first pair of points, that is, point 53 and either point 31 or point 32. This potential will always be of positive polarity regardless of the tuning of the receiver. The third potential is at least a portion of the potential difference developed between a second pair of points which are points 31 and 32. The potential between points 31 and 32 is zero for correct tuning and is of opposite polarity when the receiver is mistuned to a higher frequency or to a lower frequency than the center frequency. These three potentials are impressed on the control grid 33 through resistors 61 and 62.

Actually control grid 33 and cathode 36 of the amplifier section function as a rectifier and limit the bias voltage on the control grid to a negative value by grid rectification. If a high resistance resistor were provided between control grid 33 and the junction point of resistors 61 and 62, the voltage of the junction point of resistors 61, 62 would follow dotted curve 76 of Figure 3.

Amplifier 34 preferably is a high-mu triode which is operated with a low or medium plate supply voltage in order to provide good cut off except within the predetermined center tuning region. It is also feasible to utilize a pentode amplifier 34 in which case the cut-off characteristics may be sharpened by operating at a low screen grid voltage. Furthermore, in view of the high resistances of resistors 61 to 64 rectifiers 36, 40 and 36, 41 preferably are vacuum tube diodes rather than crystal diodes. However, rectifiers 20 and 21 may be crystal rectifiers if desired. It is, of course, to be understood that instead of providing a duo-diode triode it is feasible to provide a triode and two separate vacuum tube rectifiers.

It will now be appreciated that resistors 63, 64 serve the purpose to broaden the region within which the audio amplifier is permitted to conduct. They accomplish this purpose by allowing point 31 or point 32, as the case may be, to become positive with respect to ground by an amount which depends upon the impressed bias voltage and on the ratios of the resistances of resistors 63 and 60 or 64 and 60. The bias voltage on control grid 33 then remains above the cut-off bias voltage throughout a greater tuning range about the center frequency. However, if the ratio of the resistances of resistors 63 and 60 or 64 and 60 becomes too large, the region of the center response becomes too broad and the rejection of the side responses poorer.

It will be understood that when the frequency of the impressed carrier wave is reduced from a higher value toward the center frequency of the discriminator, the operation of the center tuning circuit of the invention will be similar to the one previously described except that the potentials at points 31 and 32 will be reversed.

The bias voltage supplied by AGC source 55 will completely eliminate the side responses on all stations except the weaker stations as clearly shown by curves 73 and 74. For the very weak stations the bias voltage supplied by source 55 is very small so that the sound will not be cut off when they are properly tuned in. In that case, however, the undesired side responses may not be entirely eliminated. However, the extent to which the undesired side responses are eliminated depends on the amount of audio gain provided in the intermediate frequency channel of the receiver ahead of the discriminator. In other words, if sufficient gain is provided ahead of the discriminator, the undesired side responses can be eliminated even for the weakest stations. The undesired side responses can be further reduced if the transformer of the discriminator network including inductors 12 and 15 has a reduced coupling so as to eliminate the double hump which appears when the transformer is overcoupled.

It is also feasible to connect a further rectifier across each of resistors 61 and 62 with the rectifier cathodes connected to points 31 and 32 respectively and the rectifier anodes connected to the junction point of the resistors 31, 32. When point 31 is negative, the rectifier connected thereto will be conducting and the other rectifier will be non-conducting. In that case, the potential of grid 33 will follow essentially the potential of the point 31 or 32 having a negative potential. Furthermore, a resistor could be connected between the junction point of the rectifier anodes and control grid 33. If these two rectifiers are provided, resistors 61 and 62 could be omitted and another resistor of 10 megohms connected between the junction point of the rectifier anodes and ground to provide for a return path for the direct current from grid 33.

It will be noted that the center tuning circuit of the invention does not require an audio filter network between the discriminator rectifier output circuit and the center tuning circuit of the invention. Furthermore, the tuning circuit does not require an extra tuned or resonant circuit. Unless the tuned circuit response of the extra squelch circuit exactly centers on the discriminator, operation will be imperfect. Since both the discriminator tuning and the extra squelch circuit resonant frequency are almost certain to drift or may even be misaligned initially, a definite limit on the reliability of such circuits is encountered. Furthermore, an extra tuned circuit is likely to result in absorption of energy from the discriminator circuit and distort the audio response. It will be understood that either broadening resistors 63, 64 or dropping resistors 60 may be eliminated without substantially impairing the operation of the circuit. However, they cannot be both eliminated.

The automatic gain control voltage impressed on the discriminator rectifier of Figure 1 may be between 0 to —10 volts dependng upon the signal strength. It is also feasible to provide a battery instead of source 55 to supply the bias voltage. The battery may be arranged for example to impress a bias voltage of between —4 and —5 volts for strong stations or as little as —1 volt for weak stations. The amount of bias voltage required depends upon the strength of the carrier wave impressed on circuits 11, 14, and upon the cut-off bias characteristics of the amplifier portion of tube 34.

While it will be understood that the circuit specifications of the detector of the invention may vary according to the design for any particular application, the following circuit specifications are included, by way of example only, as suitable for an intermediate frequency of 21.25 megacycles:

| | |
|---|---|
| Duo-diode triode 34 | Type 6AV6 |
| Anode voltage supply +B----volts-- | 135 |
| Capacitor 28 ---micro-microfarads-- | 270 |
| Capacitor 30 ---------microfarads-- | .01 |
| Capacitor 44 ---------------do---- | .002 |
| Capacitor 47 ---------------do---- | .01 |
| Capacitor 50 ---------------do---- | .005 |
| Capacitor 52 ---------------do---- | .01 |
| Resistor 26 ----------------ohms-- | 100,000 |
| Resistor 27 -----------------do---- | 100,000 |
| Resistor 56 -----------------do---- | 9,000 |
| Resistor 57 -----------------do---- | 9,000 |
| Resistor 58 -----------------do---- | 5,600 |
| Resistor 60 -----------------do---- | 6,800,000 |
| Resistor 61 -----------------do---- | 10,000,000 |
| Resistor 62 -----------------do---- | 10,000,000 |
| Resistor 63 -----------------do---- | 3,900,000 |
| Resistor 64 -----------------do---- | 3,900,000 |
| Resistor 42 -----------------do---- | 330,000 |
| Resistor 43 -----------------do---- | 22,000 |
| Resistor 45 -----------------do---- | 1,000,000 |
| Resistor 48 -----------------do---- | 82,000 |

Referring now to Figure 4 there is illustrated a modified center tuning circuit in accordance with the present invention which forms part of a ratio detector. The ratio detector illustrated in Figure 4 is of the type disclosed and claimed in the Seeley Patent 2,496,818. The angle modulated carrier wave is again impressed on input terminals 10 across which is connected inductor 12 which forms the primary circuit of the discriminator network. Inductor 12 may also be tuned to a predetermined center frequency if desired.

Secondary circuit 14 includes inductor 15 across which is connected capacitor 16. Secondary circuit 14 is tuned to the desired or predetermined center frequency of the discriminator. The midpoint of inductor 15 is connected to tertiary winding 78 which is inductively coupled to inductor 12 as indicated by bracket 17. Inductors 12 and 15 are inductively coupled.

Anode 22 of rectifier 20 and cathode 25 of rectifier 21 are connected to the terminals of inductor 15. The discriminator network including primary circuit 11, secondary circuit 14 and tertiary winding 78 operates in the manner previously explained. In view of the tight coupling between inductors 12 and 78 a reference wave is injected by tertiary winding 78 which appears at anode 22 and cathode 25. This reference carrier wave is again compared with the two carrier wave voltages which are developed at the terminals of inductor 15. The thus obtained variations of the magnitudes of the carrier wave voltages are impressed on anode 22 and cathode 25 in the manner previously explained.

Rectifiers 20 and 21 are connected to provide a direct current path through the rectifiers and a pair of resistors 80 and 81 connected between cathode 24 and anode 23. The junction point of resistors 80 and 81 is point 32 which is bypassed to ground for audio frequency currents by capacitor 82.

Capacitor 83 and modifying resistor 84 are connected in series across resistors 80 and 81, that is, between cathode 24 and anode 23. As is conventional for a ratio detector, capacitor 83 and resistors 80, 81 have a time constant which is long compared to any cycle of the modulation signal. Thus if the modulation signal is an audio signal, the time constant of capacitor 83 and resistors 80, 81 may be of the order of 0.1 second.

In the manner explained in the Seeley Patent 2,496,818 resistor 84 modifies the action of the time constant network 80, 81, 83. Accordingly, the extent of the phase deviations which determine the relative magnitudes of the carrier wave voltages impressed on anode 22 and cathode 25 and which depend upon the angular modulations of the impressed carrier wave are varied by the time constant network 80, 81, 83 as an inverse function of the undesired amplitude variations of the carrier wave impressed on input terminals 10. Modifying resistor 84 in turn modifies the inverse function relating the phase deviations of the carrier waves appearing at anode 22 and cathode 25 to the undesired amplitude variations of the original waves.

Cathode 24 and anode 23 are bypassed to ground for carrier frequency currents by bypass capacitors 85 and 86 respectively. The demodulated modulation signal may be derived from point 31 which is the free terminal of tertiary winding 78. Capacitor 87 connected between point 31 and ground may be considered the load impedance element of the detector output circuit. The audio signal is then impressed through resistor 43 and capacitor 44 connected in series on potentiometer resistor 45 from which the signal is obtained by variable tap 46 and coupling capacitor 47 and is impressed on control grid 33 of the audio amplifier 34.

The audio signal is developed in a conventional manner and further description of the operation of the ratio detector is not believed to be necessary. The direct current voltages which are utilized for the center tuning circuit of the invention are obtained from point 31 and point 32, the latter being grounded for audio frequency currents. Resistors 63 and 64 are again connected between point 32 and anode 40 and between point 31 and anode 41 respectively. Resistors 61 and 62 are connected respectively between points 32 and 31 and control grid 33. The required bias voltage may be obtained from battery 55 or else from a source of AGC voltage as shown in Figure 1. The bias voltage is impressed through dropping resistor 60 on anode 23.

The operation of the center tuning circuit of the invention is substantially the same as previously described. The clamping diodes 36, 40 and 36, 41 will tend to hold either point 32 or 31 at a fixed potential while the other point is permitted to go in a negative direction. The audio amplifier 36, 33, 37 is permitted to become conducting in the predetermined center tuning region. The fixed bias voltage impressed through battery 55 will eliminate interstation noise and will substantially eliminate the undesired side responses. This bias voltage may be obtained from the AGC voltage developed in the receiver or from the oscillator grid bias voltage. Alternatively, a positive bias voltage may be impressed through a small bleeder resistor on cathode 36 which will also normally bias off the audio amplifier sections 36, 33, 37 and the two rectifiers 36, 40 and 36, 41. If a fixed bias voltage is used as shown in Figure 4, it may be desirable to provide a switch or threshold control to disconnect battery 55 for the reception of very weak stations.

In the same manner as previously described, a direct current control potential is impressed on control grid 33. This potential consists in part of the potential developed by battery 55. Furthermore, a positive potential is impressed thereon which is developed between the junction point of anode 23 and resistor 60 and point 32. This potential will always be positive as explained hereinbefore. The third potential is developed between points 31 and 32 and changes its polarity as the receiver is mistuned from a frequency below to a frequency above the center frequency.

The following circuit specifications are included by way of example for the circuit of Figure 4:

| | |
|---|---|
| Duo-diode triode 34 | 6AV6 |
| Capacitor 85 ____ micro-microfarads | 100 |
| Capacitor 86 ____ do | 100 |
| Capacitor 87 ____ do | 600 |
| Capacitor 83 ____ microfarads | 2 |
| Capacitor 82 ____ do | .005 |
| Capacitor 44 ____ do | .05 |
| Capacitor 47 ____ do | .01 |
| Capacitor 52 ____ do | .01 |
| Resistor 80 ____ ohms | 15,000 |
| Resistor 81 ____ do | 15,000 |
| Resistor 84 ____ do | 2,200 |
| Resistor 60 ____ do | 100,000 |
| Resistor 61 ____ do | 10,000,000 |
| Resistor 62 ____ do | 10,000,000 |
| Resistor 63 ____ do | 56,000 |
| Resistor 64 ____ do | 56,000 |
| Resistor 43 ____ do | 15,000 |
| Resistor 45 ____ do | 1,000,000 |
| Resistor 42 ____ do | 220,000 |

There has thus been disclosed an angle modulated carrier wave detector having a muting or center tuning circuit which will substantially eliminate the undesired side responses on all stations except on very weak stations. Intercarrier noise is also eliminated. The center tuning circuit of the invention does not require either an audio filter network or an additional resonant circuit. Since many audio amplifiers already are provided with a pair of additional diode anodes, the circuit of the invention requires but a few additional resistors and capacitors.

What is claimed is:

1. In combination with a source of angle-modulated carrier waves, a tuned discrminator network coupled to said source for deriving from said waves a pair of carrier-wave voltages whose relative magnitudes are dependent upon the angular modulations of said waves, a pair of rectifiers, said discriminator network being connected to said rectifiers for impressing said voltages on respective ones of said rectifiers, a rectifier output circuit connected to said rectifiers and having a first pair of potential points across which a first potential of constant positive polarity is developed from said waves and a second pair of potential points across which a second potential is developed which is zero in response to the frequency of said waves coinciding with the predetermined frequency of said discriminator network and of opposite polarity in response to the frequency of said waves being higher and respectively lower than said predetermined frequency, an amplifier having at least a cathode, an anode and a control grid, a source of direct current potential and a resistor connected serially between said cathode and said rectifier circuit, and circuit connections between said rectifier output circuit and the cathode and control grid of said amplifier for developing the modulation signal and impressing it on said amplifier, said last-named circuit connections including means for applying a control potential to said control grid which is a composite sum of the potential developed by said source of direct current potential together with a positive potential across said first pair of points and at least a portion of a negative potential difference developed across said second pair of points, thereby to render said amplifier conducting only when the center frequency of said waves coincides substantially with said predetermined frequency.

2. In combination with a source of angle modulated carrier waves, a tuned frequency responsive discriminator network coupled to said source for deriving from said waves a pair of carrier wave voltages whose relative magnitudes are dependent upon the angular modulations of said waves, a pair of rectifiers, said discriminator network being connected to said rectifiers for impressing said voltages on respective ones of said rectifiers, a rectifier output circuit connected to said rectifiers and including resistors defining a first pair of potential points across which a first potential of constant positive polarity is developed from said waves and a second pair of potential points across which a second potential is developed which is zero in response to the frequency of said waves coinciding with the predetermined frequency of said discriminator network and of opposite polarity in response to the frequency of said waves being higher and respectively lower than said predetermined frequency, an amplifier having at least a cathode, an anode and a control grid, a source of potential responsive to the average amplitude of said waves and a resistor connected serially between said cathode and said rectifier circuit, an alternating current circuit connection between said rectifier output circuit and the cathode and control grid of said amplifier for developing the modulation signal and impressing it on said amplifier, and a direct current circuit connection between said rectifier output circuit and said cathode and grid and including means for applying a control potential to said control grid which is a composite sum of the potential developed by said source of potential together with a positive potential across said first pair of points and at least a portion of a negative potential difference developed across said second pair of points, thereby to render said amplifier conducting only when the center frequency of said waves coincides substantially with said predetermined frequency.

3. In combination with a source of angle modulated carrier waves, a tuned discriminator network coupled to said source for deriving from said waves a pair of carrier wave voltages whose relative magnitudes are dependent upon the angular modulations of said waves, a pair of rectifiers, said discriminator network being connected to said rectifiers for impressing said voltages on respective ones of said rectifiers, a rectifier output circuit connected to said rectifiers and including a pair of resistors defining a first pair of potential points across which a first potential of constant positive polarity is developed from said waves and a second pair of potential points across which a second potential is developed which is zero in response to the frequency of said waves coinciding with the predetermined frequency of said discriminator network and of opposite polarity in response to the frequency of said waves being higher and respectively lower than said predetermined frequency, an amplifier having at least a cathode, an anode and a control grid, a source of direct current potential and a resistor connected serially between said cathode and said rectifier circuit, an alternating current circuit connection between said rectifier output circuit and the cathode and control grid of said amplifier for developing the modulation signal and impressing it on said amplifier, a direct current circuit connection between said rectifier output circuit and said cathode and grid for applying a control potential to said control grid which is a composite sum of the potential developed by said source of direct current potential together with a positive potential across said first pair of points, and a pair of clamping diodes for applying a portion of the potential difference developed across said second pair of points in constant negative polarity, thereby to render said amplifier conducting only when the center frequency of said waves coincides substantially with said predetermined frequency.

4. In combination with a source of angle modulated carrier waves, a discriminator network coupled to said source for deriving from the waves a pair of carrier wave voltages whose relative magnitudes are dependent upon the angular modulations of the waves, a first pair of rectifiers, said discriminator network being coupled to said first pair of rectifiers for impressing said voltages on respective ones of said first pair of rectifiers, a first resistor connected in circuit with said first pair of rectifiers so that the direct current through at least one of said rectifiers will flow through said resistor, an amplifier having at least a cathode, an anode and a control grid, a first circuit connection between said first pair of rectifiers and said control grid for developing the modulation signal and impressing it on said amplifier, a second direct current circuit connection between said first resistor and said control grid and between said first circuit connection and said control grid for impressing direct current voltages on said grid, a second pair of rectifiers, each having a cathode and an anode, means maintaining said rectifier and amplifier cathodes at the same potential, a source of potential connected between said amplifier cathode and said first resistor to normally cut off said amplifier and said second pair of rectifiers, and a further pair of resistors connected individually between the anodes of said second pair of rectifiers and said second direct current circuit connection, thereby to render said amplifier conducting when the center frequency of said waves coincides substantially with a predetermined frequency.

5. In combination with a source of angle modulated carrier waves, a discriminator network coupled to said source for deriving from the waves a pair of carrier wave voltages whose relative magnitudes are dependent upon the angular modulations of the waves, a first pair of rectifiers, said discriminator network being coupled to said first pair of rectifiers for impressing said voltages on respective ones of said first pair of rectifiers, a first resistor connected in circuit with said first pair of rectifiers so that the direct current through at least one of said rectifiers will flow through said resistor, an amplifier having at least a cathode, an anode and a control grid, a first circuit connection between said first pair of rectifiers and said control grid for developing the modulation signal and impressing it on said amplifier, a second direct current circuit connection between said first resistor and said control grid and between said first connection and said control grid for impressing direct current voltages on said grid, a second pair of rectifiers, each having a cathode and an anode, means maintaining said rectifier and amplifier cathodes at the same potential, a direct current circuit including a resistive impedance element connecting said anodes to said first resistor and said second direct current circuit connection respectively, and a source of potential and a second resistor connected serially between said amplifier cathode and said first resistor to normally cut off said amplifier and said second pair of rectifiers, thereby to render said amplifier conducting when the center frequency of said waves coincides substantially with a predetermined frequency.

6. In combination with a source of angle modulated carrier waves, a discriminator network coupled to said source for deriving from the waves a pair of carrier wave voltages whose relative magnitudes are dependent upon the angular modulations of the waves, a first pair of rectifiers, said discriminator network being coupled to said first pair of rectifiers for impressing said voltages on respective ones of said first pair of rectifiers, a first resistor connected in circuit with said first pair of rectifiers so that the direct current through at least one of said rectifiers will flow through said resistor, an amplifier having a cathode, an anode and a control grid, a first circuit connection between said first pair of rectifiers and said control grid for developing the modulation signal and impressing it on said amplifier, a second direct current circuit connection including a resistive impedance element between said first resistor and said control grid and between said first circuit connection and said control grid for impressing direct current voltages on said grid, a second pair of rectifiers, each having a cathode and an anode, means maintaining said amplifier and rectifier cathodes at the same potential, a source of potential and a second resistor connected serially between said amplifier cathode and said first resistor to normally cut off said amplifier and said second pair of rectifiers, and a further pair of resistors connected individually between the anodes of said second pair of rectifiers and said second direct current circuit connection, thereby to render said amplifier conducting when the center frequency of said waves coincides substantially with a predetermined frequency.

7. In combination with a source of angle modulated carrier waves, a discriminator network coupled to said source for deriving from the waves a pair of carrier wave voltages whose relative magnitudes are dependent upon the angular modulations of the waves, a first pair of rectifiers, said discriminator network being coupled to said first pair of rectifiers for impressing said voltages on respective ones of said first pair of rectifiers, a first resistor connected in circuit with said first pair of rectifiers so that the direct current through at least one of said rectifiers will flow through said resistor, an amplifier having a cathode, an anode and a control grid, a circuit connection between said first pair of rectifiers and said control grid for developing the modulation signal and impressing it on said amplifier, a second pair of resistors connected individually between said first resistor and said control grid and between said circuit connection and said control grid to apply direct current voltage to said grid representative of the direction and extent of the deviation of the center frequency of said waves from a predetermined frequency, a second pair of rectifiers each having a cathode and an anode, means maintaining said rectifier and amplifier cathodes at the same potential, a source of potential and a second resistor connected serially between said amplifier cathode and said first resistor to normally cut off said amplifier and said second pair of rectifiers, and a further pair of resistors connected individually between the anodes of said second pair of rectifiers and said first resistor and said circuit connection.

8. In a tunable angle-modulated carrier wave receiver, a source of angle modulated carrier waves, a discriminator network coupled to said source for developing a pair of carrier wave voltages whose relative magnitudes are a function of the angular modulations of the waves, a first pair of rectifiers, said network being coupled to said rectifiers for impressing said voltages on respective ones of said first pair of rectifiers, an output circuit coupled to said first pair of said rectifiers and including at least one load impedance element, an amplifier having a cathode, an anode and a control grid, a first circuit connection between said output circuit and the grid and cathode of said amplifier for impressing the modulation signals on said amplifier, a source of voltage and a resistor connected serially between said cathode and said load impedance element and so poled as to normally cut off said amplifier, a second direct current connection including a resistive impedance element between two distinct points of said output circuit and said control grid to impress thereon voltages representative of the deviation of the center frequency of said angle modulated carrier waves and the predetermined frequency of said discriminator network, a second pair of rectifiers, each having a cathode and an anode, means maintaining the cathodes of said second pair of rectifiers and the cathode of said amplifier at the same potential, and a further pair of resistors connected individually between the anodes of said second pair of rectifiers and said two distinct points of said output circuit.

9. In an angle-modulated carrier wave receiver, a source of angle-modulated carrier waves, a discriminator network coupled to said source for developing a pair of carrier wave voltages whose relative magnitudes are a function of the angular modulations of the waves, a first pair of rectifiers, said network being coupled to said first pair of rectifiers for impressing said voltages on respective ones of said first pair of rectifiers, an output circuit coupled to said first pair of rectifiers and including a pair of load impedance elements, a connection between the junction point of said load impedance elements and an intermediate point of said network, an amplifier having a cathode, an anode and a control grid, a first circuit connection between said load impedance elements and the grid and cathode of said amplifier for adding differentially the modulation signals developed across each of said load impedance elements and impressing them on said amplifier, a second direct current connection between each of said load impedance elements and said grid for adding the direct currents developed across each of said load impedance elements and impressing them on said grid, a source of voltage and a resistor connected serially between said cathode and said load impedance elements and so poled as to normally cut off said amplifier, a second pair of rectifiers each having a cathode and an anode, means maintaining the cathodes of said second pair of rectifiers and the cathode of said amplifier at the same potential, and a pair of resistors connected individually between the anodes of said pair of rectifiers and each of said load impedance elements, thereby to render said amplifier conducting when the center frequency of said angle-modulated carrier waves coincides substantially with the predetermined frequency of said discriminator network.

10. In a tunable frequency modulated carrier wave receiver, a source of frequency modulated carrier waves, a frequency discriminator network coupled to said source for deriving from the waves a pair of carrier wave voltages whose relative magnitudes are a function of the frequency of said waves, a first pair of rectifiers, each having a cathode and an anode, a first connection between said discriminator network and the anodes of said first pair of rectifiers for impressing said voltages on respective ones of said rectifiers, a first pair of load resistors connected serially between the cathodes of said first pair of rectifiers, a second connection between the junction point of said first pair of resistors and an intermediate point of said discriminator network, a modulation signal amplifier having at least a cathode, a control grid and an anode, a modulation signal circuit connection between the cathode of one of said first pair of rectifiers and said grid, a second pair of rectifiers each having an anode and a common cathode with that of said amplifier, a source of bias voltage and a further resistor connected serially between the cathode of said amplifier and said second connection, a second pair of resistors, each being connected between one of the anodes of said second pair of rectifiers and the cathodes of said first pair of rectifiers, and a direct current connection including a resistive impedance element between the cathodes of said first pair of rectifiers and said grid.

11. In a frequency modulated carrier wave receiver, a source of frequency modulated carrier waves, a frequency discriminator network coupled to said source for deriving from the waves a pair of carrier wave voltages whose relative magnitudes are a function of the frequency of said waves, a first pair of rectifiers, each having a cathode and an anode, a first connection between said discriminator network and the anodes of said first pair of rectifiers for impressing said voltages on respective ones of said rectifiers, a first pair of load resistors connected serially between the cathodes of said first pair of rectifiers, a second connection between the junction point of said first pair of resistors and an intermediate point of said discriminator network, a modulation signal amplifier having a cathode, a control grid and an anode, a modulation signal circuit connection between the cathode of one of said first pair of rectifiers and said grid, a second pair of rectifiers each having an anode and a common cathode with that of said amplifier, a source of bias voltage connected between the cathode of said amplifier and said second connection, a second pair of broadening resistors connected individually between the cathodes of said first pair of rectifiers and the anodes of said second pair of rectifiers, and a third pair of resistors, each being connected between one of the cathodes of said first pair of rectifiers and said grid.

12. In a frequency modulated carrier wave receiver, a source of frequency modulated carrier waves, a frequency discriminator network coupled to said source for deriving from the waves a pair of carrier wave voltages whose relative magnitudes are a function of the frequency of said waves, a first pair of rectifiers, each having a cathode and an anode, a first connection between said discriminator network and the anodes of said first pair of rectifiers for impressing said voltages on respective ones of said rectifiers, a first pair of load resistors connected serially between the cathodes of said first pair of rectifiers, a second connection between the junction point of said first pair of resistors and an intermediate point of said discriminator network, a modulation signal amplifier having a cathode, a control grid and an anode, a modulation signal circuit connection between the cathode of one of said first pair of rectifiers and said grid, a second pair of rectifiers each having an anode and a common cathode with that of said amplifier, a source of bias voltage and a further resistor connected serially between the cathode of said amplifier and said second connection, a second pair of broadening resistors connected individually between the cathodes of said first pair of rectifiers and the anodes of said second pair of rectifiers, and a third pair of resistors each being connected between one of the cathodes of said first pair of rectifiers and said grid.

13. In a tunable frequency modulated carrier wave receiver, a source of frequency modulated carrier waves, a frequency discriminator network coupled to said source for deriving from the waves a pair of carrier wave voltages whose relative magnitudes are a function of the frequency of said waves, a first pair of rectifiers, each having a cathode and an anode, a first connection between said discriminator network and the anodes of said first pair of rectifiers for impressing said voltages on respective ones of said rectifiers, a first pair of load resistors connected serially between the cathodes of said first pair of rectifiers, a second connection between the junction point of said first pair of resistors and an intermediate point of said discriminator network, a modulation signal amplifier having a cathode, a control grid and an anode, a carrier wave bypass capacitor connected between the cathode of one of said first pair of rectifiers and the cathode of said amplifier, a further modulation signal bypass capacitor connected between the cathode of the other one of said first pair of rectifiers and the cathode of said amplifier, a modulation signal circuit connection between the cathode of said one of said first pair of rectifiers and said grid, a second pair of rectifiers, each having an anode and a common cathode with that of said amplifier, a source of bias voltage and a further resistor connected serially between the cathode of said amplifier and said second connection, a second pair of broadening resistors connected individually between the cathodes of said first pair of rectifiers and the anodes of said second pair of rectifiers, and a third pair of resistors, each being connected between one of the cathodes of said first pair of rectifiers and said grid.

14. In a frequency modulated carrier wave receiver, a source of frequency modulated carrier waves, a frequency discriminator network coupled to said source for deriving from the waves a pair of carrier wave voltages whose relative magnitudes are a function of the frequency of said waves, a first and a second rectifier, each having a cathode and an anode, a first circuit connection between said discriminator network and the anode of said first rectifier and the cathode of said second rectifier for impressing said voltages on respective ones of said rectifiers, a first pair of resistors connected serially between the cathode of said first rectifier and the anode of said second rectifier, a first capacitor and a further resistor connected across said first pair of resistors, a modulation signal amplifier having at least a cathode, an anode and a control grid, a second pair of resistors connected respectively between an intermediate point of said discriminator network and said grid and between the junction point of said first pair of resistors and said grid, a load impedance element connected between said intermediate point and the cathode of said amplifier, a modulation signal connection between said intermediate point and said grid, a third and a fourth rectifier, each having an anode and a cathode common with the cathode of said amplifier, a source of bias voltage connected between the cathode of said amplifier and the anode of said second rectifier, and a third pair of broadening resistors connected individually between the outer terminals of said second pair of resistors and the anodes of said third and fourth rectifier.

15. In a frequency modulated carrier wave receiver, a source of frequency modulated carrier waves, a frequency discriminator network coupled to said source for deriving from the waves a pair of carrier wave voltages whose relative magnitudes are a function of the frequency of said waves, a first and a second rectifier, each having a cathode and an anode, a first circuit connection between said discriminator network and the anode of said first rectifier and the cathode of said second rectifier for impressing said voltages on respective ones of said rectifiers, a first pair of resistors connected serially between the cathode of said first rectifier and the anode of said second rectifier, a first capacitor and a further resistor connected across said first pair of resistors, a modulation signal amplifier having a cathode, an anode and a control grid, a second pair of resistors connected respectively between an intermediate point of said discriminator network and said grid and between the junction point of said first pair of resistors and said grid, a modulation signal connection between said intermediate point and said grid, a third and a fourth rectifier, each having an anode and a common cathode with said amplifier, a source of bias voltage and an additional resistor connected serially between the cathode of said amplifier and the anode of said second rectifier, and direct current connections between the anodes of said third and fourth rectifier and said intermediate point of said discriminator network and said junction point of said first pair of resistors respectively.

16. In a frequency modulated carrier wave receiver, a source of frequency modulated carrier waves, a frequency discriminator network coupled to said source for deriving from the waves a pair of carrier wave voltages whose relative magnitudes are a function of the frequency of said waves, a first and a second rectifier, each having a cathode and an anode, a first circuit connection between said discriminator network and the anode of said first rectifier and the cathode of said second rectifier for impressing said voltages on respective ones of said rectifiers, a first pair of resistors connected serially between the cathode of said first rectifier and the anode of said second rectifier, a first capacitor and a further resistor connected across said first pair of resistors, a modulation signal amplifier having a cathode, an anode and a control grid, a pair of carrier wave bypass capacitors connected individually between the cathode of said first rectifier and the cathode of said amplifier and between the anode of said second rectifier and the cathode of said amplifier, a modulation signal frequency bypass capacitor connected between the junction point of said first pair of rectifiers and the cathode of said amplifier, a second pair of resistors connected respectively between an intermediate point of said discriminator network and said grid and between the junction point of said first pair of resistors and said grid, a modulation signal connection between said second intermediate point and said grid, a third and a fourth rectifier, each having an anode and a cathode, means maintaining the cathodes of said third and fourth rectifiers and the cathode of said amplifier at the same potential, a source of bias voltage and an additional resistor connected serially between the cathode of said amplifier and the anode of said second rectifier, and a third pair of broadening resistors connected individually between the outer terminals of said second pair of resistors and the anodes of said third and fourth rectifier.

17. In a tunable frequency modulated carrier wave receiver, a source of frequency modulated carrier waves, a frequency discriminator network coupled to said source for deriving from the waves a pair of carrier wave voltages whose relative magnitudes are a function of the frequency of said waves, a first and a second rectifier, each having a cathode and an anode, a first circuit connection between said discriminator network and the anode of said first rectifier and the cathode of said second rectifier for impressing said voltages on respective ones of said rectifiers, a first pair of resistors connected serially between the cathode of said first rectifier and the anode of said second rectifier, a first capacitor and a further resistor connected across said first pair of resistors, a modulation signal amplifier having a cathode, an anode and a control grid, a pair of carrier wave bypass capacitors connected individually between the cathode of said first rectifier and the cathode of said amplifier and between the anode of said second rectifier and the cathode of said amplifier, a modulation signal frequency bypass capacitor connected between the junction point of said first pair of rectifiers and the cathode of said amplifier, a second pair of resistors connected respectively between an intermediate point of said discriminator network and said grid and between the junction point of said first pair of resistors and said grid, a load impedance element connected between said intermediate point and the cathode of said amplifier, a modulation signal connection between said intermediate point and said grid, a third and a fourth rectifier, each having an anode and a cathode common with the cathode of said amplifier, a source of bias voltage and an additional resistor connected serially between the cathode of said amplifier and the anode of said second rectifier, and a third pair of broadening resistors connected individually between the outer terminals of said second pair of resistors and the anodes of said third and fourth rectifier.

References Cited in the file of this patent

UNITED STATES PATENTS

| Number | Name | Date |
|---|---|---|
| 2,371,397 | Koch | Mar. 13, 1945 |
| 2,379,688 | Crosby | July 3, 1945 |